E. D. BARRETT.
MOTOR STARTER.
APPLICATION FILED DEC. 7, 1917.

1,313,618.

Patented Aug. 19, 1919.
2 SHEETS—SHEET 1.

Ernest D. Barrett,
Inventor:
by Merwin & Swenarton,
His Attys.

E. D. BARRETT.
MOTOR STARTER.
APPLICATION FILED DEC. 7, 1917.

1,313,618.

Patented Aug. 19, 1919.
2 SHEETS—SHEET 2.

Ernest D. Barrett,
Inventor:
by Merwin Swarton,
His Attys.

UNITED STATES PATENT OFFICE.

ERNEST D. BARRETT, OF NEW YORK, N. Y., ASSIGNOR TO BARRETT MOTOR STARTER CORPORATION, OF NEW YORK, N. Y., A CORPORATION OF DELAWARE.

MOTOR-STARTER.

1,313,618.  Specification of Letters Patent.  Patented Aug. 19, 1919.

Application filed December 7, 1917. Serial No. 206,000.

*To all whom it may concern:*

Be it known that I, ERNEST D. BARRETT, a citizen of the United States, residing in New York, county and State of New York, have invented new and useful Improvements in Motor-Starters, of which the following is a specification.

This invention relates to improvements in so-called self-starters for automobile explosive engines of the compression type and has for its objects the production of such a starting mechanism which is adapted to be operated by means of a foot-pedal, which can be adjusted if desired so as to turn over the engine a plurality of times and which is adapted to fit various makes of cars without requiring material alterations of the car.

Heretofore, as I am well aware, various constructions of self-starters have been proposed, including those operated by means of a foot-pedal, but most of such constructions were easily distorted and thrown out of adjustment by repeated use thereof, and it was often necessary to radically alter the car to which they were applied in order to accommodate the starter mechanism.

My invention is fully described in detail in the accompanying specification and drawings forming a part thereof, in which—

Figure 1:
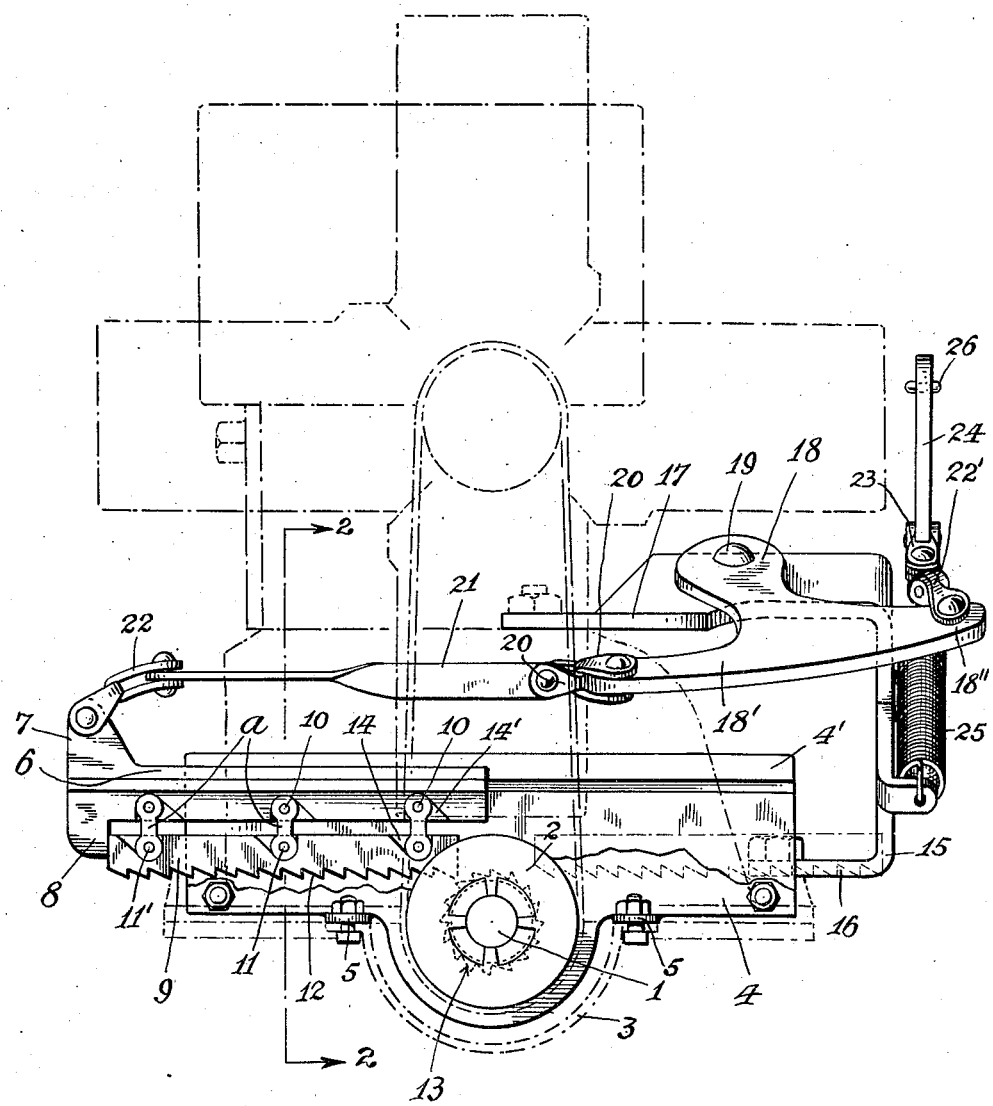
Figure 2:
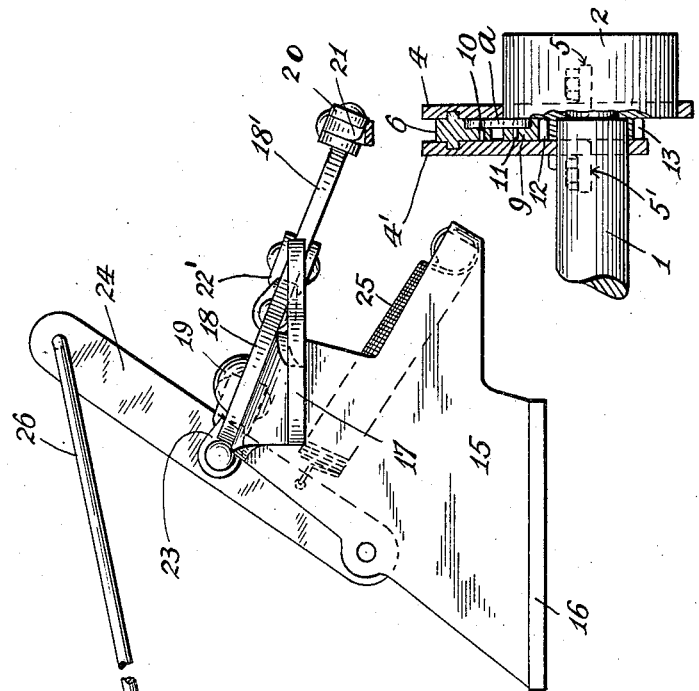
Figure 2:
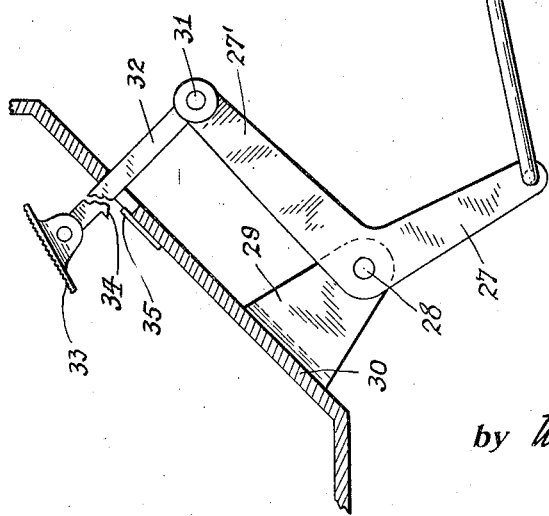

Figure 1 is a front elevation, showing the front guide partially broken away, of my improved starting mechanism as applied to the chassis of a Ford automobile; and Fig. 2 is a side elevation, partly in section, of the same mechanism.

Referring to the drawings and the construction shown therein, 1 designates the engine shaft which the starter is adapted to actuate, 2 the fan pulley-wheel mounted on said shaft and 3 the housing surrounding said shaft and pulley-wheel. Two elongated, longitudinally grooved members 4, 4', provided with bottom flanges 5, 5', are securely bolted together and to the bed-plate of the engine to form a guide for a slidable carriage 6. The latter is provided with upwardly and downwardly projecting ears or lugs 7 and 8 respectively, and is adapted to carry a rack 9 which is suspended from said carriage by means of links *a* mounted upon pivots 10 and 11 respectively. Said rack is provided with a series of teeth 12 adapted to optionally mesh with the teeth of a ratchet wheel 13 which is splined to said shaft 1. The carriage and said rack are provided with angular recesses 14, 14', each having a vertical and an inclined end wall, as shown, whereby an oscillatory movement of said rack with the consequent yielding connection between said ratchet and the rack is obtained. Thereby the intentional or accidental return movement of the rack over the ratchet for the purposes hereinafter described is permitted.

A U-shaped frame 15, having arms 16 and 17, which is also bolted to the engine frame, serves as a support for a bell-crank lever 18, having arms 18', 18'', which is secured to said frame by a pivot 19. The arm 18' is connected by means of a duplex link 20, rod 21, and duplex link 22 to the heel 7 of the carriage 6. Preferably as shown, the rod 21 and the arms 18', 18'' of the bell-crank lever move substantially in parallelism with the line of travel of the carriage and consequently there is considerable less tendency for the carriage and its guide to bind than were the power impulse applied to the carriage at a substantial angle to its line of travel.

The other arm 18'' of the said bell-crank lever is in turn pivotally connected by means of a link 22' and bar 23 to a lever 24 which is fulcrumed at its lower end to the frame 15. A coil spring 25, one end of which is secured to the middle of said lever and the other end to an integral lug of said frame 15, serves to normally hold the lever 24 and the parts operated thereby, in the position shown in Figs. 1 and 2, and consequently the rack 9 normally assumes the position shown in Fig. 2.

A rod 26 connects the upper end of the lever 24 to the lower arm of a second bell-crank lever consisting of arms 27, 27', which is fulcrumed at 28 to a plate 29 on the lower face of a foot-board 30. The other end 27' of this second bell-crank lever is connected by a pivot 31 to a bar 32 having a foot-pedal 33 pivotally mounted in its other end. A catch 34 which is adapted to engage the projecting lip 35 on its return stroke, serves to hold the foot-pedal in a depressed position so as not to interfere with the operation of the other foot-pedals of the car.

The operation of my starting mechanism, as is apparent from the foregoing description, is accomplished by releasing the catch holding the foot-pedal in a depressed position and thereby causing the rack 9 to move from its negative position, as indicated in dotted lines in Fig. 1, into the positive position, as shown in the full lines of Fig. 1. Then the pedal is depressed by a quick pressure of the foot thereupon and the action of the two bell-crank levers 27 and 18, with the intermediate connections, effect a left-to-right movement of the carriage 9 and as a result the teeth 12 of the rack mesh with the ratchet wheel 13 and turn over the engine shaft. Since the number of rotations of the engine shaft is in direct proportion to the number of teeth adapted to mesh with the teeth of the ratchet wheel, carried by the rack 9, I am able to secure a partial, a complete, or several rotations of the shaft by merely varying the number of teeth and correspondingly varying the length of the rack and its slide.

In the event of any back-fire of the engine before the rack passes completely beyond and out of mesh with the ratchet 13, the said ratchet will spin in an anti-clockwise direction and consequently will shove the rack 9 into its extreme left-hand position against the lug 8 wherein it is disengaged from said ratchet.

The niches or recesses 14, 14' permit of the swinging movement of the links $a$ and accordingly give a flexibility to the rack which permits not only of its teeth readily passing over the ratchet wheel when the rack is intentionally returned by the operator from the dotted line position to the full line position, as shown in Fig. 1, but also such construction permits of the rack yielding by swinging upwardly in the event of the premature starting of the engine after the shaft has been but partially revolved by a relatively slight movement of the rack across said ratchet. Thereby any possible fracture of the ratchet teeth on said rack, or any other portions of the mechanism, as would almost inevitably occur were the rack directly mounted in the guides in lieu of being yieldingly secured to a slidable carriage, is prevented.

The aforesaid duplex links consist of two pairs of arms the members of each pair lying in planes parallel to each other and at right angles to the members of the other pair and said pairs being all rigidly joined together by an integral central web.

Various modifications from the within described preferred form of my constructions may be made without departing from the principles involved in my invention as herein claimed.

Having thus described my invention, what I claim and desire to secure by Letters Patent is:—

1. In a motor starter, the combination with the shaft of a motor, of a ratchet wheel secured to said shaft and adapted to rotate therewith, a slidable carriage, a longitudinal guide therefor, a rack yieldingly secured to said carriage and provided with teeth adapted to mesh with said ratchet wheel, and means for positively forcing the teeth of said rack into engagement with said ratchet wheel in order to impart a substantial rotary impulse to said shaft.

2. In a motor starter, the combination with the shaft of a motor, of a ratchet wheel secured to said shaft and adapted to rotate therewith, a slidable carriage, a rack movably secured to said carriage and provided with teeth adapted to mesh with said ratchet wheel, a stop limiting the backward movement of said rack, a guide for said carriage of sufficient length to admit of said rack passing completely across and beyond said ratchet wheel, whereby said rack may be disengaged from said ratchet, and means for positively forcing the teeth of said rack into engagement with said ratchet wheel in order to impart a substantial rotary impulse to said shaft.

3. In a motor starter, the combination with the shaft of a motor, of a ratchet wheel secured to said shaft and adapted to rotate therewith, a slidable carriage, a rack movably secured to said carriage and provided with teeth adapted to mesh with said ratchet wheel, a stop limiting the backward movement of said rack, a guide for said carriage of sufficient length to admit of said rack passing completely across and beyond said ratchet wheel, whereby said rack may be disengaged from said ratchet, and means, including a foot-pedal, for positively forcing the teeth of said rack into engagement with said ratchet wheel in order to impart a substantial rotary impulse to said shaft.

Signed at New York, county and State of New York, this 4th day of December, 1917.

ERNEST D. BARRETT.

Copies of this patent may be obtained for five cents each, by addressing the "Commissioner of Patents, Washington, D. C."